United States Patent [19]

Kock et al.

[11] Patent Number: 4,749,769

[45] Date of Patent: Jun. 7, 1988

[54] FULLY AROMATIC MESOMORPHIC POLYESTERS AND THEIR PREPARATION

[75] Inventors: Hans-Jakob Kock, Ludwigshafen; Michael Portugall, Wachenheim; Bernd Hisgen, Limburgerhof; Jürgen Mertes, Ludwigshafen, all of Fed. Rep. of Germany

[73] Assignee: BASF Aktiengesellschaft, Ludwigshafen, Fed. Rep. of Germany

[21] Appl. No.: 64,700

[22] Filed: Jun. 22, 1987

[30] Foreign Application Priority Data

Jun. 27, 1986 [DE] Fed. Rep. of Germany ....... 3621519

[51] Int. Cl.$^4$ .................... C08G 63/02; C08G 63/18
[52] U.S. Cl. .................... 528/193; 528/176; 528/179; 528/194
[58] Field of Search ................ 528/176, 179, 193, 194

[56] References Cited

U.S. PATENT DOCUMENTS

| | | | |
|---|---|---|---|
| 4,156,070 | 5/1979 | Jackson et al. | 528/191 |
| 4,238,600 | 12/1980 | Jackson et al. | 528/193 |
| 4,412,058 | 10/1983 | Siemionko | 528/191 |
| 4,499,259 | 2/1985 | Irwin | 528/190 |
| 4,614,789 | 9/1986 | Dicke et al. | 528/128 |
| 4,664,972 | 5/1987 | Connolly | 528/194 X |

FOREIGN PATENT DOCUMENTS 0070539  7/1982  European Pat. Off. .
139303  1/1983  European Pat. Off. .

*Primary Examiner*—Lucille M. Phynes
*Attorney, Agent, or Firm*—Oblon, Fisher, Spivak, McClelland & Maier

[57] ABSTRACT

Fully aromatic mesomorphic polyesters which give a liquid crystalline filament-forming melt below 300° C. consist of (a) from 5 to 25 mol % of repeating units of the formula I

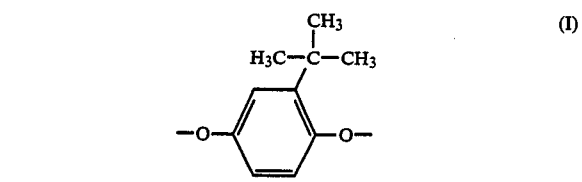

(b) from 5 to 25 mol % of repeating units of the formula II

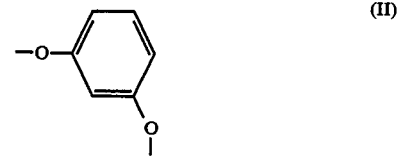

(c) from 10 to 50 mol % of repeating units of the formula III

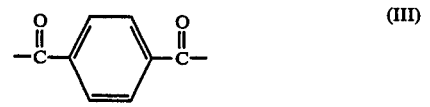

and
(d) not less than 10 mol % of repeating units of the formula IV

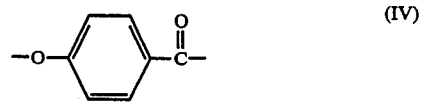

the sum of the molar amounts of components (a), (b), (c) and (d) being 100 mol %, and the molar ratio of components (a) and (b) to component (c) being from 0.9:1 to 1.1:1.

5 Claims, No Drawings

FULLY AROMATIC MESOMORPHIC POLYESTERS AND THEIR PREPARATION

The present invention relates to fully aromatic mesomorphic polyesters which give a liquid crystalline filament-forming melt below 300° and essentially consist of (a) from 5 to 25 mole % of repeating units of the formula I

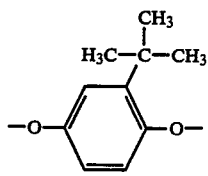

(b) from 5 to 25 mole % of repeating units of the formula II

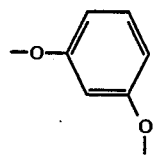

(c) from 10 to 50 mole % of repeating units of the formula III

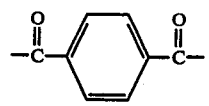

and (d) not less than 10 mol % of repeating units of the formula IV

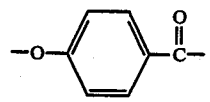

the sum of the molar amounts of components (a), (b), (c) and (d) being 100 mole %, and the molar ratio of components (a) and (b) to component (c) being from 0.9:1 to 1.1:1.

The present invention furthermore relates to a process for the preparation of polyesters of this type, their use for the production of fibers, films, coatings and moldings, and moldings obtainable from such polyesters as essential components.

A number of fully aromatic liquid crystalline polyesters have been described. U.S. Pat. No. 4,224,433 discloses liquid crystalline polyesters which consist of units derived from 2,6-dihydroxyanthraquinone, 3-hydroxybenzoic acid, terephthalic acid and/or isophthalic acid. The polyesters described there have relatively high melting points and can be processed only at above 300° C. Furthermore, they have glass transition temperatures of less than 130° C., with the result that the heat distortion resistance is unsatisfactory.

U.S. Pat. No. 4,219,461 describes liquid crystalline polyesters which consist of units derived from 4-hydroxybenzoic acid, 2,6-hydroxynaphthalenecarboxylic acid, hydroquinone and terephthalic acid. However, such polyesters do not possess sufficient heat distortion resistance. The same applies to the liquid crystalline polyesters which are disclosed in German Laid-Open application DOS No. 3,325,705 and consist of units derived from 4-hydroxybenzoic acid, terephthalic acid and/or isophthalic acid and 2,7-dihydroxynaphthalene and, if appropriate, hydroquinone.

European patent application No. 72,540 furthermore discloses aromatic polyesters which are based on terephthalic acid, 4-hydroxybenzoic acid and hydroquinone and are substituted by tertiary alkyl of not less than 5 carbon atoms. However, such polyesters can be processed only at above 300° C. No information is given about their heat distortion resistance.

It is an object of the present invention to provide fully aromatic liquid crystalline polyesters which permit low processing temperatures but have good properties in sustained use at elevated temperatures and are furthermore distinguished by little intrinsic color, a smooth surface and good resistance to chemicals.

We have found that this object is achieved by the fully automatic mesomorphic polyesters defined at the outset.

The novel fully aromatic mesomorphic polyesters have the advantage that they do not require a high processing temperature and moreover have good properties in sustained use at elevated temperatures. The said polyesters are also distinguished by high rigidity and toughness and have a smooth abrasion-resistant surface, little intrinsic color and good resistance to chemicals.

It is noteworthy and surprising that polyesters which contain up to 45 mol % of angular and laterally substituted units form a liquid crystalline phase.

The liquid crystalline state of the polyesters can be detected under the polarization microscope by a method described in German Published application DAS No. 2,520,819. Between crossed polarizers, the polyester melts, applied in a layer not less than 10 μm thick between glass plates, have textures which can be assigned to a mesomorphic phase.

The novel polyesters consist of (a) from 5 to 25, in particular from 9 to 22, mol % of repeating units of the formula I

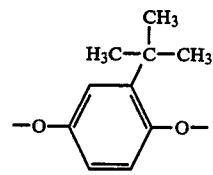

tert-butylhydroquinone advantageously being used as a starting compound, (b) from 5 to 25, in particular from 9 to 22, mol % of repeating units of the formula II

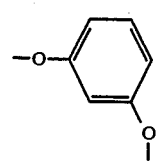

resorcinol advantageously being used as a starting compound, (c) a molar amount of repeating units of the formula III

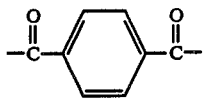

which corresponds to the sum of (a) and (b), terephthalic acid preferably being used as a starting compound, and (d) not less than 10 mol % of repeating units of the formula IV

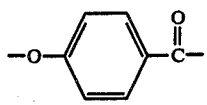

for example 4-hydroxybenzoic acid being used as a starting compound.

The sum of the molar amounts of components (a), (b), (c) and (d) is 100 mol % in each case.

The molar ratio of hydroxyl-containing monomers (a, b) to carboxyl-containing monomers (c) is from 0.9:1 to 1.1:1, preferably from 0.95:1 to 1.05:1; in particular, about equivalent amounts of these monomers are used.

Apart from the nonderivatized starting compounds, their ester-forming derivatives too are suitable starting compounds, such as the corresponding carbonyl chlorides, carboxylates, or hydroxy compounds esterified with lower fatty acids.

Polyesters which contain not less than 30 mol % of repeating units of the formula IV are particularly preferred.

Preferred fully aromatic mesomorphic polyesters have a glass transition temperature of ≧135° C. The glass transition temperature should be measured by the DSC method, described by K. H. Illers in Makromolekulare Chemie 127 (1969), page 1 et seq. The fully aromatic mesomorphic polyesters according to the invention form a liquid crystalline filament-forming melt at <300° C., in particular <280° C. Liquid crystalline polyesters which are partially crystalline at temperatures >220° C. and >280° C. are also preferred.

The novel copolyesters can be obtained by a number of techniques, as described in, for example, U.S. Pat. No. 4,375,530 and U.S. Pat. No. 4,118,372.

The polyesters according to the invention are particularly advantageously obtained by condensation using anhydrides of lower fatty acids, in particular acetic anhydride, in the presence or absence of a catalyst, at elevated temperatures. In this procedure, the dry starting compounds together with excess fatty acid anhydride, the latter advantageously in not less than 5% molar excess, based on the hydroxyl groups present, are heated to the reflux temperature in an inert gas atmosphere. The reaction mixture is kept at 150°–200° C. for, for example, up to 5, preferably up to 2, hours, after which the temperature is increased to 300°–350° C., for example in the course of from 2 to 2½ hours. The fatty acid and fatty acid anhydride are distilled off. To complete the reaction, it is advantageous to employ reduced pressure, for example down to 5 mbar, toward the end of the condensation.

The fact that the reaction proceeds readily and completely even without the addition of a catalyst to give the desired polymers in a relatively short time is noteworthy and could not be foreseen for the use of a single reaction step. This is all the more remarkable since, because of the large number of chemically different hydroxyl groups, gradation of the reactivities and hence an unsatisfactory polymer structure were to be expected.

The resulting fully aromatic liquid crystalline polyesters can be further condensed in the solid state, for example at from 150° to 250° C., until the desired viscosity is obtained. This postcondensation in the solid phase can be carried out either before or after thermoplastic processing.

The polyesters according to the invention can be modified by conventional additives, such as stabilizers, antioxidants, heat stabilizers, UV stabilizers, lubricants, mold release agents, colorants, such as dyes and pigments, fibrous or powdered fillers and reinforcing agents, nucleating agents or plasticizers. Such substances are used in the conventional effective amounts.

The stabilizers can be added to the polymers at any stage of the preparation, or to the prepared polymers. The stabilizers are preferably added at an early stage in order to prevent decomposition from beginning before the polymers can be protected.

The antioxidants and heat stabilizers include those which are generally added to polymers, such as halides of metals of group I of the Periodic Table, e.g. halides of sodium, potassium or lithium, such as chlorides, bromides or iodides, with copper(I) halides, such as chlorides, bromides or iodides, sterically hindered phenols, hydroquinones, various substituted members of these groups and combinations of these in concentrations of up to 1% by weight, based on the polymer. Examples of suitable UV stabilizers are substituted resorcinols, salicylates, benzotriazoles, benzophenone and the like, as well as mixtures of these. Such UV stabilizers are generally used in amounts of up to 2% by weight, based on the polymer.

It is also possible to add organic dyes, such as nigrosine, and pigments, such as titanium dioxide, cadmium sulfide, cadmium sulfide selenides, phthalocyanines, ultramarine blue or carbon black. Dyes and pigments are used in general in amounts of up to 5% by weight.

Other suitable additives are fibrous or powdered fillers and reinforcing agents, such as carbon fibers, glass fibers, amorphous silica, asbestos, calcium silicate, aluminum silicate, magnesium carbonate, kaolin, chalk, powdered quartz, mica or feldspar. Fillers and reinforcing agents are as a rule used in amounts of up to 70% by weight, based on the material treated in this manner.

Examples of suitable nucleating agents are talc, calcium fluoride, sodium phenylphosphinate, alumina and finely divided polytetrafluoroethylene.

Finally, suitable additives are plasticizers in amounts of up to 20% by weight, e.g. dioctyl phthalate, dibenzyl phthalate, butylbenzyl phthalate, hydrocarbons, n-butylbenzenesulfonamide or o- or p-tolueneethylsulfonamide.

The novel fully aromatic liquid crystalline polyesters are useful for the production of filaments, films, foams and industrial moldings by injection molding, pressing or extrusion.

The moldings produced from the novel polyesters possess excellent mechanical properties, such as rigidity, strength and toughness. They are extremely resistant to chemicals. Furthermore, they have high heat distortion resistance and a smooth abrasion-resistant surface. The novel polymers are therefore very useful for the production of moldings for the electrical industry and electronic data processing, automotive construction and other industrial areas. However, they can also be used as coating materials, in the form of a dispersed powder or as a film.

The Examples which follow illustrate the invention.

EXAMPLE 1

0.2 mole of terephthalic acid, 0.26 mole of 4-hydroxybenzoic acid, 0.1 mole of tert-butylhydroquinone, 0.1 mole of resorcinol and 0.86 mole of acetic anhydride were weighed into a flask equipped with a stirrer, a nitrogen inlet and a distillation attachment, and heated under an $N_2$ atmosphere in a metal bath to 100° C. The temperature was then increased to 150° C. in the course of 30 minutes, to 200° C. in the course of a further 100 minutes and then to the final temperature of 325° C. in the course of 120 minutes.

Thereafter, the pressure was reduced to 560 mbar and then halved every 10 minutes. The pressure at the end of the reaction was 80 mbar. A highly viscous, film-forming melt was obtained. The polymer melt and the solidified polymer had a mother-of-pearl gloss. DSC measurements gave a glass transition temperature Tg of 145° C. The intrinsic viscosity was 1.6 dl/g, measured in 0.1% strength by weight solution in pentafluorophenol at 60° C. The polymer gave a filament-forming liquid crystalline melt at 280° C.

EXAMPLE 2

0.2 mole of terephthalic acid, 0.26 mole of 4-hydroxybenzoic acid, 0.06 mole of tert-butylhydroquinone, 0.14 mole of resorcinol and 0.86 mole of acetic anhydride were condensed as described in Example 1. The final temperature was 325° C. At the end of the reaction, the pressure was 30 mbar. The polymer obtained was highly viscous and filament-forming. The DSC diagrams indicated a glass transition temperature Tg of 142° C. and an endothermic melting point at 260° C. The intrinsic viscosity was 1.1 dl/g. The polymer could be processed from the melt at 290° C.

We claim:

1. A fully aromatic mesomorphic polyester which gives a liquid crystalline filament-forming melt below 300° C. and essentially consists of
    (a) from 5 to 25 mol % of repeating units of the formula I

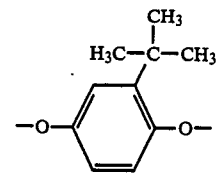

(b) from 5 to 25 mol % of repeating units of the formula II

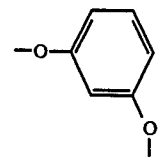

(c) from 10 to 50 mol % of repeating units of the formula III

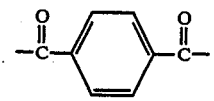

and
    (d) not less than 10 mol % of repeating units of the formula IV

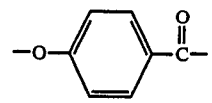

the sum of the molar amounts of components (a), (b), (c) and (d) being 100 mol %, and the molar ratio of components (a) and (b) to component (c) being from 0.9:1 to 1.1:1.

2. A fully aromatic polyester as claimed in claim 1, which contains not less than 30 mol % of component (d).

3. A process for the preparation of a polyester as claimed in claim 1, wherein the monomers are used in the form of nonderivatized hydroxyl or carboxyl compounds and are reacted with the addition of a fatty acid anhydride at from 150° to 350° C. in a single reaction step, with removal of the fatty acid and fatty acid anhydride by distillation.

4. A process as claimed in claim 3, wherein the resulting fully aromatic polyester is subjected to post-condensation in the solid phase at from 150° to 250° C.

5. A molding obtainable from a fully aromatic polyester as claimed in claim 1 as the essential component.

* * * * *